(12) United States Patent
Chen et al.

(10) Patent No.: US 8,902,576 B2
(45) Date of Patent: *Dec. 2, 2014

(54) HANDHELD COMPUTING DEVICE HAVING DROP-RESISTANT LCD DISPLAY

(75) Inventors: Chao Chen, Waterloo (CA); Felipe Oliveira Simoes, Kitchener (CA); John Holmes, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 32 days.

This patent is subject to a terminal disclaimer.

(21) Appl. No.: 13/554,624

(22) Filed: Jul. 20, 2012

(65) Prior Publication Data

US 2012/0287568 A1 Nov. 15, 2012

Related U.S. Application Data

(63) Continuation of application No. 12/258,436, filed on Oct. 26, 2008, now Pat. No. 8,289,689, which is a continuation of application No. 11/526,878, filed on Sep. 26, 2006, now Pat. No. 7,551,430, which is a continuation of application No. 10/857,968, filed on Jun. 2, 2004, now Pat. No. 7,130,185.

(51) Int. Cl.
| | |
|---|---|
| *G06F 1/16* | (2006.01) |
| *H04M 1/00* | (2006.01) |
| *G02F 1/1345* | (2006.01) |
| *H04M 1/18* | (2006.01) |

(52) U.S. Cl.
CPC ...... *G02F 1/13452* (2013.01); *G02F 2201/503* (2013.01); *H04M 1/18* (2013.01); *G06F 1/1626* (2013.01); *G06F 1/1637* (2013.01)

USPC .................................. 361/679.3; 455/575.1

(58) Field of Classification Search
USPC ............. 361/679.21–679.3; 349/58–60; 455/575.1–575.4, 575.8
See application file for complete search history.

(56) References Cited

U.S. PATENT DOCUMENTS

| | | | |
|---|---|---|---|
| 3,918,052 A | 11/1975 | Bricher | |
| 4,142,780 A * | 3/1979 | Sasaki et al. | 349/149 |
| 4,197,586 A | 4/1980 | Nidiffer | |
| 4,238,848 A * | 12/1980 | Yamaguchi et al. | 368/276 |
| 4,245,274 A * | 1/1981 | MacDonald et al. | 313/519 |
| 4,260,224 A * | 4/1981 | Takayama | 349/83 |
| 4,276,627 A * | 6/1981 | Komiyama | 368/84 |
| 4,283,784 A * | 8/1981 | Horan | 368/87 |
| 4,339,079 A * | 7/1982 | Sato et al. | 239/43 |
| 4,357,061 A * | 11/1982 | Crosby | 439/66 |

(Continued)

FOREIGN PATENT DOCUMENTS

| | | |
|---|---|---|
| CA | 2407080 A1 | 11/2001 |
| CN | 1309424 A | 8/2001 |

(Continued)

*Primary Examiner* — Adrian S Wilson
(74) *Attorney, Agent, or Firm* — McCarthy Tétrault LLP (57) ABSTRACT

A display for a handheld computing device is provided. The device comprises: a display panel; a circuit board carrying display electronics for the display panel; a motherboard; and a resilient layer having a first surface and a second surface, the first surface being adhered to the circuit board, and the second surface adhered to the motherboard, the resilient layer being positioned such that the resilient layer is disposed between the circuit board and the motherboard.

19 Claims, 4 Drawing Sheets

(56) References Cited

U.S. PATENT DOCUMENTS

| | | | | |
|---|---|---|---|---|
| 4,410,949 A | * | 10/1983 | Huellinghorst et al. | 705/413 |
| 4,422,728 A | | 12/1983 | Andreaggi | |
| 4,558,396 A | | 12/1985 | Kawabata et al. | |
| 4,683,519 A | | 7/1987 | Murakami | |
| 4,778,950 A | * | 10/1988 | Lee et al. | 174/260 |
| 5,264,992 A | | 11/1993 | Hogdahl et al. | |
| 5,274,486 A | | 12/1993 | Yamazaki et al. | |
| 5,341,233 A | * | 8/1994 | Tomoike et al. | 349/150 |
| 5,353,075 A | * | 10/1994 | Conner et al. | 353/122 |
| 5,363,227 A | | 11/1994 | Ichikawa et al. | |
| 5,489,974 A | * | 2/1996 | Kamaji et al. | 399/285 |
| 5,613,223 A | | 3/1997 | Ross et al. | |
| 5,666,261 A | | 9/1997 | Aguilera | |
| 5,710,607 A | | 1/1998 | Iwamoto et al. | |
| 5,722,055 A | | 2/1998 | Kobayashi et al. | |
| 5,929,950 A | * | 7/1999 | Matsuda | 349/60 |
| 5,936,600 A | | 8/1999 | Ohashi et al. | |
| 6,049,128 A | | 4/2000 | Kitano et al. | |
| 6,219,229 B1 | | 4/2001 | Lee | |
| 6,229,695 B1 | | 5/2001 | Moon | |
| 6,297,956 B1 | | 10/2001 | Janik et al. | |
| 6,563,705 B1 | | 5/2003 | Kuo | |
| 6,654,232 B1 | | 11/2003 | Tsao et al. | |
| 6,697,130 B2 | | 2/2004 | Weindorf et al. | |
| 6,781,055 B2 | | 8/2004 | Chen | |
| 6,980,421 B2 | | 12/2005 | Shih-Tsung | |
| 7,016,186 B2 | * | 3/2006 | Ueda et al. | 361/679.27 |
| 7,130,185 B2 | * | 10/2006 | Chen et al. | 361/679.3 |
| 7,551,430 B2 | * | 6/2009 | Chen et al. | 361/679.02 |
| 7,586,744 B2 | * | 9/2009 | Okuda | 361/679.56 |
| 7,595,983 B2 | * | 9/2009 | Okuda | 361/679.56 |
| 7,697,275 B2 | * | 4/2010 | Chen et al. | 361/679.3 |
| 7,791,682 B2 | * | 9/2010 | Jang et al. | 349/58 |
| 8,168,615 B2 | * | 5/2012 | Ueda et al. | 514/81 |
| 8,461,333 B2 | * | 6/2013 | Ueda et al. | 544/337 |
| 8,584,847 B2 | * | 11/2013 | Tages et al. | 206/320 |
| 2001/0016434 A1 | | 8/2001 | Christensen et al. | |
| 2001/0050988 A1 | | 12/2001 | Poulsen | |
| 2003/0164918 A1 | * | 9/2003 | Kela et al. | 349/149 |
| 2003/0223020 A1 | | 12/2003 | Lee | |
| 2003/0232525 A1 | * | 12/2003 | Ward et al. | 439/91 |
| 2004/0240193 A1 | | 12/2004 | Mertz et al. | |
| 2007/0285886 A1 | | 12/2007 | Huang | |

FOREIGN PATENT DOCUMENTS

| | | |
|---|---|---|
| CN | 1461965 A | 12/2003 |
| DE | 20 2004 001 349 U1 | 5/2004 |
| EP | 0642089 A1 | 3/1995 |
| EP | 0947910 A2 | 4/1999 |
| GB | 2190529 A | 5/1997 |

* cited by examiner

HANDHELD COMPUTING DEVICE HAVING DROP-RESISTANT LCD DISPLAY

CROSS-REFERENCE TO RELATED APPLICATIONS

This patent application is a continuation of U.S. patent application Ser. No. 12/258,436 filed on Oct. 26, 2008 now U.S. Pat. No. 8,289,689, which itself if a continuation application of U.S. patent application Ser. No. 11/526,878 filed on Sep. 26, 2006 now U.S. Pat. No. 7,551,430, which itself is a continuation of U.S. patent application Ser. No. 10/857,968 (now U.S. Pat. No. 7,130,185) filed Jun. 2, 2004.

FIELD

This patent application relates to a handheld computing device. In particular, this patent application relates to a configuration for a handheld computing device having a LCD display that is resistant to shock loading damage due to impact.

BACKGROUND

The conventional handheld computing device, such as a PDA or a wireless telephone, includes a keyboard/keypad, a display assembly and a system motherboard (not shown) contained within a common housing. The display assembly is typically provided as a reflective, transmissive or transreflective LCD display panel.

To limit power losses and the effects of noise on image quality, the LCD display electronics must be disposed in close proximity to the LCD display panel. Accordingly, the LCD display electronics are provided on a printed circuit board that is housed within a plastic or metal support frame, together with the LCD display panel. Typically, the display electronics and the LCD display panel are press-fitted within the frame and the frame is secured to the motherboard with permanent adhesive or screws.

The LCD display panel is prone to damage resulting from shock loading due to impact. Since the LCD display panel is fixed within the support frame and the support frame is secured to the motherboard, the LCD display panel can sustain shock impact damage if the handheld computing device is struck or dropped.

Further, in view of the method by which the LCD display panel and the LCD display electronics are assembled together, typically the entire display assembly must be discarded if the LCD display panel becomes damaged. As a result, repairs cost are often excessively high.

Therefore, there is a need for a configuration for a handheld computing device that reduces the sensitivity of the LCD display panel to jarring impact damage. Further, there is a need for a configuration for a handheld computing device that reduces the repair costs of the display assembly.

SUMMARY

In a first aspect, a display for a handheld computing device is provided. The device comprises: a display panel; a circuit board carrying display electronics for the display panel; a motherboard; and a resilient layer having a first surface and a second surface, the first surface being adhered to the circuit board, and the second surface adhered to the motherboard, the resilient layer being positioned such that the resilient layer is disposed between the circuit board and the motherboard.

In the display, the resilient layer may further have an internal opening to receive a component located on a bottom side of the display circuit board.

In the display, the resilient layer may comprise: an upper horizontal end; a lower horizontal end; and a pair of vertical sides extending between the upper and lower horizontal ends.

In the display, the first surface may be a permanent adhesive surface; and the second surface may be a removable adhesive surface.

In the display, the second surface may comprise a repositional adhesive.

In the display, the second surface may comprise a repositional adhesive that is disposed only along the upper and horizontal ends of the resilient layer.

In the display, the second surface may comprise a repositional adhesive that is disposed only along the pair of vertical sides of the resilient layer.

In the display, the second surface may comprise a repositional adhesive that is disposed only in corners of the resilient layer.

The display may further comprise a light guide coupled to the display panel and the display circuit board, the light guide including first and second clips for securing the display to a circuit board of the computing device, the first and second clips being configured to allow the display to move relative to the computing device when the display panel is mounted to the computing device.

The display may further comprise a light reflective plate located between the display circuit board and the light guide.

The display may further comprise a pair of opposed cover plates fastened to the light guide and being configured to provide electrostatic discharge (ESD) protection for the display panel and the display circuit board.

In the display, the display panel, the display circuit board and the light guide may be disposed between the cover plates.

In the display, the cover plates may include locking tabs that fasten the cover plates to the light guide.

In the display, the light guide may include at least one guide pin for aligning the display panel with the display circuit board of the computing device.

In a second aspect, a handheld computing device is provided. The device comprises: a motherboard; a display mounted to the motherboard, the display comprising a display panel and a display circuit board carrying display electronics for the display panel; and a resilient layer having a first surface and a second surface, the first surface being adhered to the circuit board, and the second surface adhered to the motherboard, the resilient layer being positioned such that the resilient layer is disposed between the circuit board and the motherboard.

In the handheld computing device, the resilient layer may further have an internal opening to receive a component located on a bottom side of the display circuit board.

In the handheld computing device, the first surface may be a permanent adhesive surface; and the second surface may be a removable adhesive surface.

In the handheld computing device, the display may further comprise a light reflective plate located between the motherboard and the light guide; and the handheld computing device may further comprise a light guide coupled to the display panel and the display circuit board; the light guide including first and second clips for securing the display to a second circuit board of the handheld computing device, the first and second clips located at first and second sides of the light guide and being configured to allow the display to move relative to the motherboard.

The handheld computing device may further comprise a pair of opposed cover plates fastened to the light guide and being configured to provide ESD protection for the display panel and the display circuit board.

In the handheld computing device, the display panel, the display circuit board and the light guide may be disposed between cover plates fastened to the light guide.

Another aspect of this disclosure relates to a display for a handheld computing device. The display comprises a display panel, a display circuit board carrying display electronics for the display panel and a light guide coupled to the display panel and the display circuit board. The light guide includes at least one snap clip for securing the display to a circuit board of the handheld computing device. The least one snap clip is configured to allow the display to move relative to the computing device when the display panel is mounted to the computing device.

Another aspect of this disclosure relates to a handheld computing device. The handheld computing device comprises a motherboard and a display mounted to the motherboard. The comprises a display panel, a display circuit board carrying display electronics for the display panel and a light guide coupled to the display panel and the display circuit board. The light guide includes at least one snap clip securing the display to the motherboard. The at least one snap clip is configured to allow the display to move relative to the motherboard.

Another aspect of this disclosure relates to a method for manufacturing a handheld computing device. The method involves providing a display device and mounting the display device to the computing device. The display device comprises a display panel, a display circuit board carrying display electronics for the display panel and a light guide coupled to the display panel and the display circuit board. The light guide includes at least one snap clip. The display device is mounted to the computing device by urging the display device towards the motherboard until the at least one snap clip engages an edge of the motherboard. The at least one snap clip is configured to allow the display to move relative to the motherboard.

The display may also comprise a pair of opposed cover plates that are fastened to the light guide and are configured to provide ESD protection for the display panel and the display circuit board. The display panel, the display circuit board and the light guide may be disposed between the cover plates. The cover plates may include locking tabs that fasten the front and rear metal cover plates to the light guide. Therefore, the method of manufacture may involve disposing the display panel and the display circuit board between the cover plates and fastening the cover plates to the light guide.

The light guide may also include at least one guide pin for aligning the display with the circuit board of the computing device. The motherboard may comprise at least one locate pin hole and the method of manufacture may involve aligning the at least guide pin within the at least one locate hole. The least one guide pin and locate hole may dimensioned to allow the display device to move relative to the computing device.

The display may also include a resilient layer adhered to the display circuit board. The resilient layer may include a first adhesive surface adhered to the display circuit board and a second adhesive surface opposite the first adhesive surface. The resilient layer may be positioned such that the resilient layer is disposed between the display circuit board and the circuit board of the computing device when the display panel is mounted to the computing device. The resilient layer may be configured to support the display panel and to limit impact forces applied to the display panel when the display panel is mounted to the computing device. The method of manufacture may involve pressing the resilient layer against the motherboard until the second adhesive surface adheres to the motherboard.

BRIEF DESCRIPTION OF THE DRAWINGS

The foregoing aspects will now be described, by way of example only, with reference to the accompanying drawings, in which.

DETAILED DESCRIPTION OF THE PREFERRED EMBODIMENT

Figure 1:
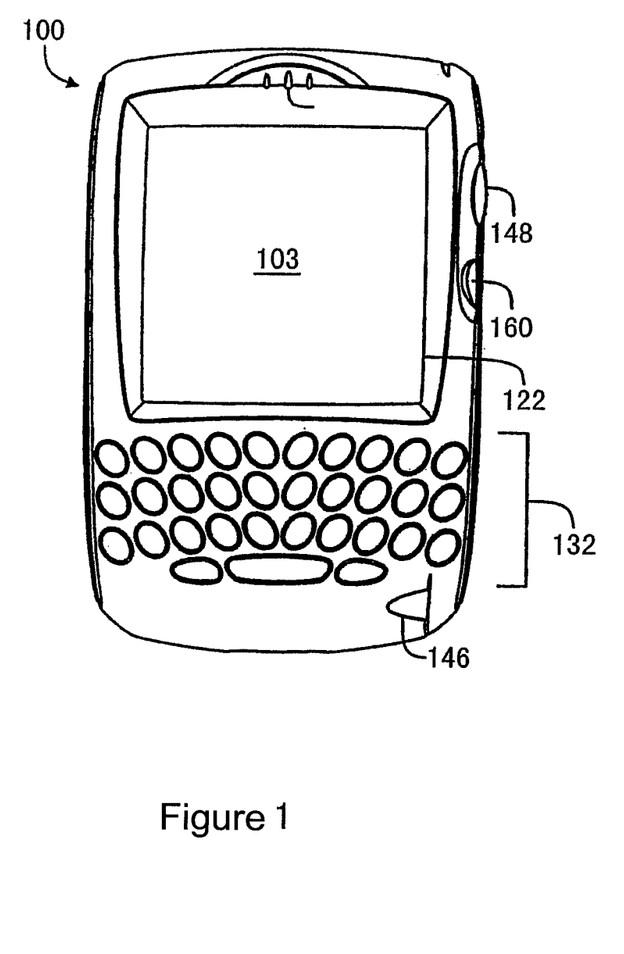
FIG. 1 is a front plan view of a handheld computing device.

Referring now to FIG. 1, there is shown a handheld computing device, denoted generally as 100, that includes a display 122, a function key 146 and a system motherboard 102 (not shown) disposed within a common housing. The display 122 is a self-contained peripheral device that is connected to the system motherboard.

The function key 146 functions as a power on/off switch for the handheld computing device 100 and may also function as a backlight key for the display 122.

In addition to the display 122 and the function key 146, the handheld computing device 100 includes user data input means for inputting data to the data processing means. As shown, preferably the user data input means includes a keyboard 132, a thumbwheel 148 and an escape key 160.

Typically, the handheld computing device 100 is a two-way wireless communication device having at least voice and data communication capabilities. Further, preferably the handheld computing device 100 has the capability to communicate with other computer systems over the Internet. Depending on the exact functionality provided, the wireless handheld computing device 100 may be referred to as a data messaging device, a two-way pager, a wireless e-mail device, a cellular telephone with data messaging capabilities, a wireless Internet appliance or a data communication device, as examples.

Figure 2:
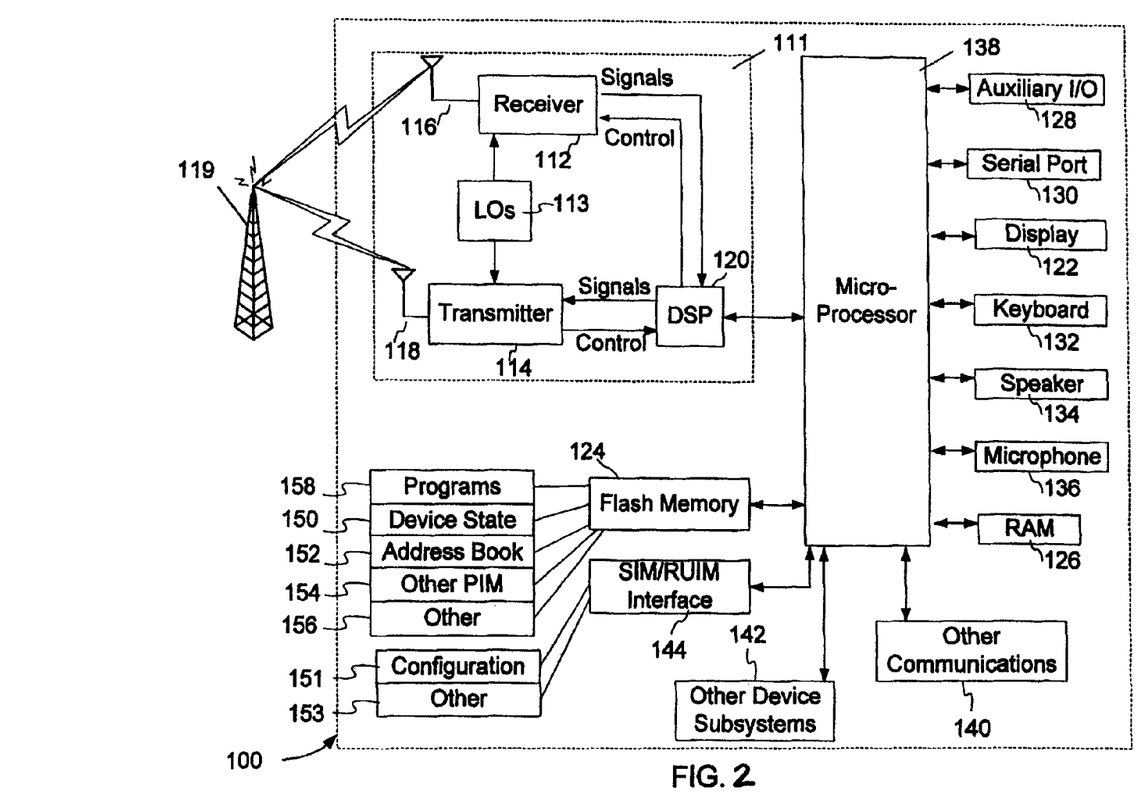
FIG. 2 is a schematic view depicting functional details of the handheld computing device.

FIG. 2 depicts functional details of the handheld computing device 100. Where the handheld computing device 100 is enabled for two-way communication, the motherboard 102 will incorporate a communication subsystem 111, including both a receiver 112 and a transmitter 114, as well as associated components such as one or more, preferably embedded or internal, antenna elements 116 and 118, local oscillators (LOs) 113 and a processing module such as a digital signal processor (DSP) 120. As will be apparent to those skilled in the field of communications, the particular design of the communication subsystem 111 will be dependent upon the communication network in which the device is intended to operate. For example, the handheld computing device 100 may include a communication subsystem 111 designed to operate within the Mobitex™ mobile communication system, the DataTAC™ mobile communication system, GPRS network, UMTS network, EDGE network or CDMA network.

Network access requirements will also vary depending upon the type of network 119. For example, in the Mobitex and DataTAC networks, the handheld computing device 100 is registered on the network using a unique identification number associated with each handheld computing device. In UMTS and GPRS networks, and in some CDMA networks, however, network access is associated with a subscriber or user of the handheld computing device 100. A GPRS handheld computing device therefore requires a subscriber identity module (SIM) card in order to operate on a GPRS network and a RUIM in order to operate on some CDMA networks. Without a valid SIM/RUIM card, a GPRS/UMTS/CDMA handheld computing device may not be fully functional. Local or non-network communication functions, as well as legally required functions (if any) such as "911" emergency calling, may be available, but the handheld computing device 100 will be unable to carry out any other functions involving communications over the network. The SIM/RUIM interface 144 is normally similar to a card-slot into which a SIM/RUIM card can be inserted and ejected like a diskette or PCMCIA card. The SIM/RUIM card can have approximately 64K of memory and hold many key configuration 151 and other information 153, such as identification and subscriber related information.

When required network registration or activation methods have been completed, the handheld computing device 100 may send and receive communication signals over the network 119. Signals received by antenna 116 through communication network 119 are input to receiver 112, which may perform such common receiver functions as signal amplification, frequency down conversion, filtering, channel selection and the like and in the example system shown in FIG. 2, analog to digital (A/D) conversion. ND conversion of a received signal allows more complex communication functions such as demodulation and decoding to be performed in the DSP 120. In a similar manner, signals to be transmitted are processed, including modulation and encoding for example, by DSP 120 and input to transmitter 114 for digital to analog conversion, frequency up conversion, filtering, amplification and transmission over the communication network 119 via antenna 118. DSP 120 not only processes communication signals, but also provides for receiver and transmitter control. For example, the gains applied to communication signals in receiver 112 and transmitter 114 may be adaptively controlled through automatic gain control algorithms implemented in DSP 120.

The handheld computing device 100 preferably includes a microprocessor 138 which controls the overall operation of the device. Communication functions, including at least data and voice communications, are performed through communication subsystem 111. Microprocessor 138 also interacts with further device subsystems such as the display 122, flash memory 124, random access memory (RAM) 126, auxiliary input/output (I/O) subsystems 128, serial port 130, keyboard 132, speaker 134, microphone 136, a short-range communications subsystem 140 and any other device subsystems generally designated as 142.

Typically, the communication subsystem 111, flash memory 124, RAM 126, I/O subsystems 128, serial port 130, keyboard 132, speaker 134, microphone 136, microprocessor 138 and the subsystems 140, 142 are provided on the motherboard 102 and the display 122 is provided as a self-contained unit that is physically mounted and electrically connected, to the motherboard 102. This point will be discussed in further detail below.

Some of the subsystems shown in FIG. 2 perform communication-related functions, whereas other subsystems may provide "resident" or on-device functions. Some subsystems, such as keyboard 132 and display 122, for example, may be used for both communication-related functions, such as entering a text message for transmission over a communication network and device-resident functions, such as a calculator or task list.

The operating system software used by the microprocessor 138 is preferably stored in a persistent store such as flash memory 124, which may instead be a read-only memory (ROM) or similar storage element (not shown). Those skilled in the art will appreciate that the operating system, specific device applications or parts thereof, may be temporarily loaded into a volatile memory such as RAM 126. Received communication signals may also be stored in RAM 126.

As shown, the flash memory 124 can be segregated into different areas for both computer programs 158 and program data storage 150, 152, 154 and 156. These different storage areas indicate that each program can allocate a portion of flash memory 124 for their own data storage requirements. In addition to its operating system functions, preferably the microprocessor 138 enables execution of software applications on the handheld computing device. A predetermined set of applications that control basic operations will normally be installed on the handheld computing device 100 during manufacturing. One set of basic software applications might perform data and/or voice communication functions, for example.

A preferred software application may be a personal information manager (PIM) application having the ability to organize and manage data items relating to the user of the handheld computing device, such as, but not limited to, e-mail, calendar events, voice mails, appointments and task items. Naturally, one or more memory stores would be available on the handheld computing device to facilitate storage of PIM data items. Such PIM application would preferably have the ability to send and receive data items, via the wireless network 119. In a preferred embodiment, the PIM data items are seamlessly integrated, synchronized and updated, via the wireless network 119, with the user's corresponding data items stored or associated with a host computer system.

Further applications may also be loaded onto the handheld computing device 100 through the network 119, an auxiliary I/O subsystem 128, serial port 130, short-range communications subsystem 140 or any other suitable subsystem 142 and installed by a user in the RAM 126 or preferably a non-volatile store (not shown) for execution by the microprocessor 138. Such flexibility in application installation increases the functionality of the device and may provide enhanced on-device functions, communication-related functions or both. For example, secure communication applications may enable electronic commerce functions and other such financial transactions to be performed using the handheld computing device 100.

In a data communication mode, a received signal such as a text message or web page download will be processed by the communication subsystem 111 and input to the microprocessor 138, which preferably further processes the received signal for output to the display 122 or alternatively to an auxiliary I/O device 128. A user of the handheld computing device 100 may also compose data items, such as email messages, for example, using the keyboard 132, which is preferably a complete alphanumeric keyboard or telephone-type keypad, in conjunction with the display 122 and possibly an auxiliary I/O device 128. Such composed items may then be transmitted over a communication network through the communication subsystem 111.

For voice communications, overall operation of the handheld computing device 100 is similar, except that received signals would preferably be output to a speaker 134 and signals for transmission would be generated by a microphone 136. Alternative voice or audio I/O subsystems, such as a voice message recording subsystem, may also be implemented on the handheld computing device 100. Although voice or audio signal output is preferably accomplished primarily through the speaker 134, display 122 may also be used to provide an indication of the identity of a calling party, the duration of a voice call or other voice call related information, for example.

Serial port 130 in FIG. 2 would normally be implemented in a personal digital assistant (PDA)-type handheld computing device for which synchronization with a user's desktop computer (not shown) may be desirable. The serial port 130 enables a user to set preferences through an external device or software application and would extend the capabilities of the handheld computing device 100 by providing for information or software downloads to the handheld computing device 100 other than through a wireless communication network.

Other communications subsystems 140, such as a short-range communications subsystem, is a further optional component which may provide for communication between the handheld computing device 100 and different systems or devices, which need not necessarily be similar devices. For example, the subsystem 140 may include an infrared device and associated circuits and components or a Bluetooth™ communication module to provide for communication with similarly enabled systems and devices.

Figure 3:
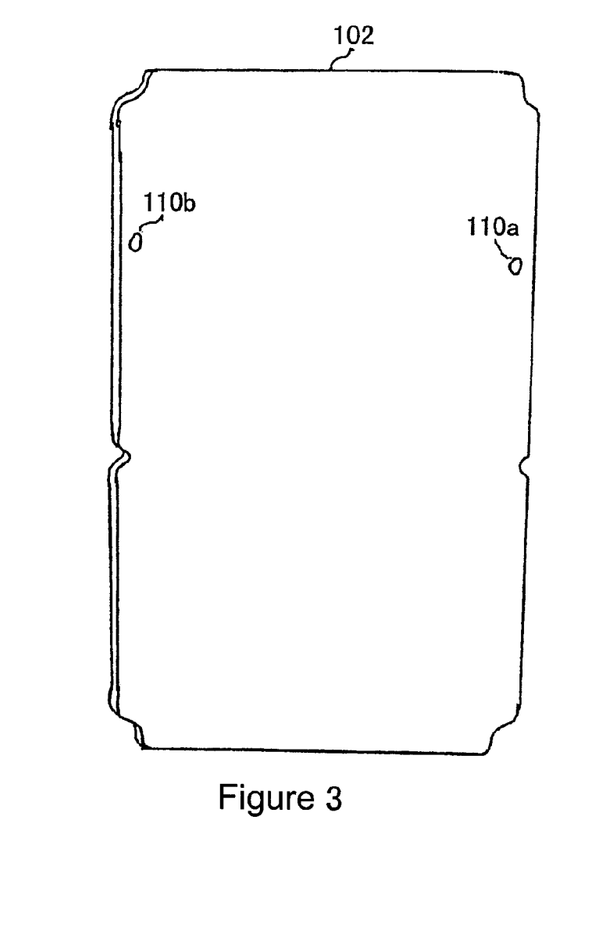
FIG. 3 is a front plan view of the motherboard of the handheld computing device.

FIG. 3 depicts the physical structure of the motherboard 102. As discussed above, the communication subsystem 111 (including the receiver 112, transmitter 114 and antenna elements 116, 118), flash memory 124, RAM 126, I/O subsystems 128, serial port 130, keyboard 132, speaker 134, microphone 136, microprocessor 138 and the subsystems 140, 142 are provided on the motherboard 102.

Figure 4:
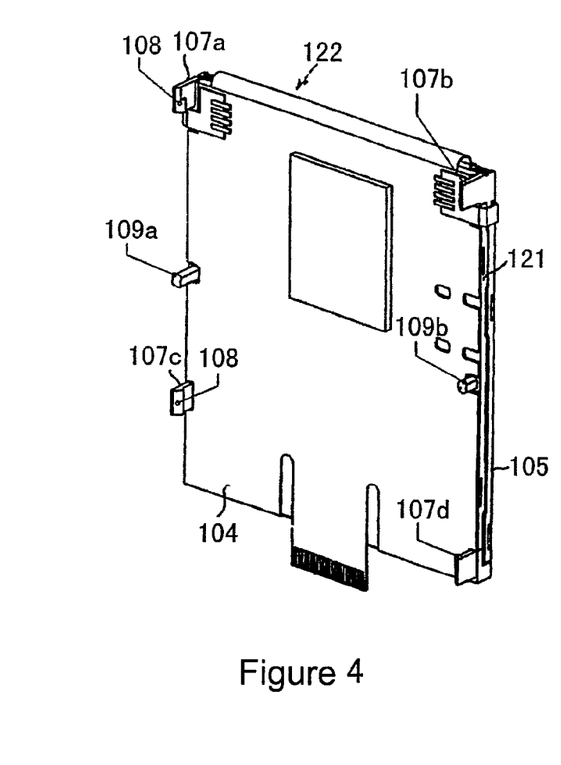
FIG. 4 is a rear perspective view of the LCD display of the handheld computing device.

FIG. 4 is a rear perspective view of the display 122. The display 122 is provided as a self-contained unit that is physically mounted and electrically connected, to the motherboard 102. The display 122 includes a display panel 103 (see FIG. 7) and a printed circuit board 104 that carries the display electronics. The printed circuit board 104 may be provided as a rigid, flexible or semi-rigid circuit board. Preferably, the display panel 103 comprises a glass LCD display panel. Alternatively, however, the display panel 103 may comprise a plastic LCD display panel.

The display panel 103 and the display circuit board 104 are retained together within a cover assembly 105 that secures the display panel 103 to the display circuit board 104. Preferably, the cover assembly 105 comprises a front metal cover plate and a rear metal cover plate that is coupled to the front cover plate. In addition to securing the display panel 103 to the display circuit board 104, the front and rear metal cover plates provide ESD protection for the display panel 103 and the display circuit board 104.

Figure 5:
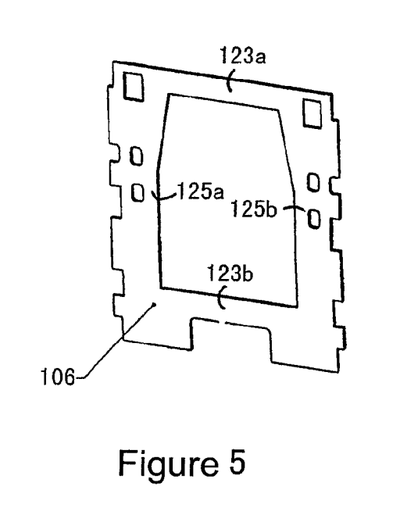
FIG. 5 is a perspective view of the resilient layer of the LCD display.

The display 122 also includes a resilient layer 106 (see FIG. 7) that is disposed between the circuit board 104 and the motherboard 102. As shown in FIG. 5, the resilient layer 106 includes an upper horizontal end 123a, a lower horizontal end 123b and a pair of vertical sides 125a, 125b extending between the horizontal ends 123a, 123b. The resilient layer 106 has a first adhesive surface that adheres the resilient layer 106 to the circuit board 104 and a second adhesive surface that adheres the resilient layer 106 to the motherboard 102. Typically, the first adhesive surface is a permanent adhesive surface and the second adhesive surface is a removable adhesive surface, although the properties of the first and second adhesive surfaces could be reversed. Alternatively, however, both the first and second adhesive surfaces could comprise removable or permanent adhesive surfaces, if desired.

Figure 6:
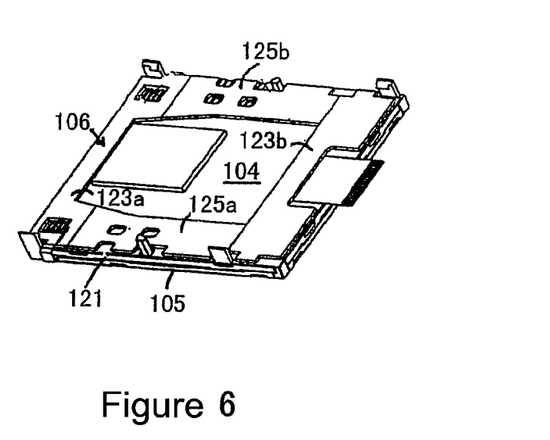
FIG. 6 is a perspective view of the LCD display, fitted with the resilient layer.

Preferably, the second adhesive surface comprises a repositional adhesive that is provided only at selected locations on the second adhesive surface so as to allow for easier removal of the display 122 from the motherboard 102. In particular, as shown in FIG. 6, preferably the repositional adhesive is disposed along the upper and lower horizontal ends 123 of the resilient layer 106, but not along the vertical sides 125. Alternatively, the repositional adhesive may be disposed along the vertical sides 125 of the resilient layer 106, but not along the upper horizontal end 123. Other configurations for the repositional adhesive will be apparent. For instance, the repositional adhesive may be disposed at the corners of the resilient layer 106.

Preferably, the resilient layer 106 comprises a slow rebound urethane foam layer that absorbs shear and impact forces. The resilient layer 106 is selected such that when the display 122 is adhered to the motherboard 102 and shear and impact forces are applied to the display panel 103, the resilient layer 106 absorbs those forces and thereby limits the likelihood of the display panel 103 becoming damaged.

In addition to the resilient layer 106, the display 122 also includes a backlight (not shown) and a light guide frame 121 that is disposed between the backlight and the display panel 103. The backlight and the light guide frame 121 are sandwiched between the front and rear cover plates of the cover assembly 105. The front and rear cover plates include locking tabs (not shown) that fasten the front and rear metal cover plates to the light guide frame 121. From front to back, the display 122 comprises the front cover plate, the display panel 103, one pair of orthogonal brightness enhancing films, a light diffuser film, the light guide frame 121, the backlight, a light reflective plate, the printed circuit board 104 and the rear cover plate.

Figure 7:
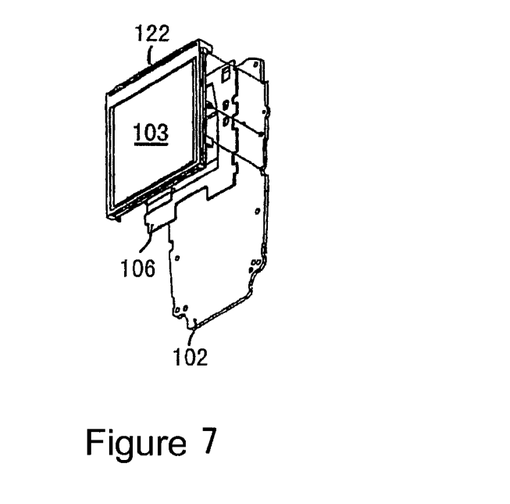
FIG. 7 is an exploded view showing the LCD display relative to the motherboard.

The light guide frame 121 includes two pairs of snap clips 107a and 107b, 107c and 107d that extend towards the motherboard 102 and assist in securing the display 122 to the motherboard 102 of the handheld computing device 100. The snap clips 107 include laterally-opposed head portions 108 that loosely engage the opposing edges of the motherboard 102 so as to allow the display 122 to move towards or away from the motherboard 102, within a limited range as defined by the snap clips 107.

Preferably, the light guide frame 121 also includes a pair of pins 109a, 109b that extend towards the motherboard 102. The pins 109a, 109b are received in correspondingly-located holes 110a, 110b that are formed in the motherboard 102 and serve to align the display 122 with the motherboard 102. The holes 110 are slightly oversized so as to allow the display 122 to move laterally relative to the motherboard 102, within a limited range as defined by the snap clips 107 and the size of the holes 110. Although the light guide frame 121 is shown having two pairs of snap clips 107 and a pair of pins 109, it should be understood that the light guide frame 121 may have any number of the clips 107 and the pins 109, as required by the dimensions and shape of the display 122.

Figure 8:
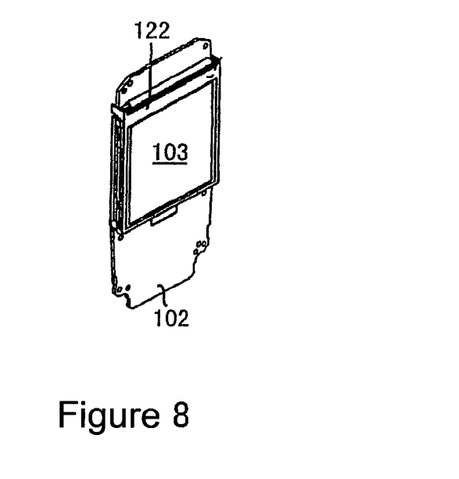
FIG. 8 is a perspective view of the LCD display secured to the motherboard.

The display 122 is mounted to the motherboard 102 by aligning the pins 109a, 109b with the locate holes 110 on the motherboard 102 and then pressing the display 122 against the proximate surface of the motherboard 102, so that the second adhesive surface of the resilient layer 106 adheres to the motherboard 102. At the same time, the snap clips 107 loosely engage the edges of the motherboard 102, with the associated head portions 108 loosely engaging the opposite surface of the motherboard 102.

When the display 122 is mounted to the motherboard 102, the display 122 is resiliently mounted to the mother board 102, in that the resilient properties of the resilient layer 106 allows the display 122 to move slightly (towards, away and laterally) relative to the motherboard 102. As a result, if the handheld computing device 100 is struck or dropped, the impact forces applied to the display panel 103 will be less than prior art computing devices. Accordingly, the likelihood of the display panel 103 of sustaining damage from such an impact is reduced.

For a handheld computing device 100 which has a 2.2 inch LCD display 122 (with a module thickness of 3.2 mm), favourable drop test characteristics (at a drop height up to one meter) can be obtained using a 0.53 mm resilient layer 106 thickness of Rogers Corporation PORON (trademark) cellular, extra soft, slow rebound PET-supported urethane foam P/N 4790-92-25021-04. The PET-supported side of the resilient layer 106 is coated with a 0.051 mm of 3 M 9667, 467 MP or 467 MPF permanent adhesive and the other side is selectively coated with 0.063 mm of Adchem 8311 M-74 low tack removable adhesive. As will be apparent, for a larger LCD display 122 (or a thinner, more fragile LCD display 122), the thickness of the resilient layer 106 would be increased.

A number of factors (such as the size and mass of the display 122 and the environment in which the handheld computing device 100 will be used) will dictate the characteristics of the resilient layer 106, the adhesives applied to the resilient layer 106. For example, to facilitate ease of disassembly (eg. for repair purposes), the surface area over which the repositional adhesive is applied to the resilient layer 106 should be as small as possible. On the other hand, the surface area over which the permanent and repositional adhesives are applied to the resilient layer 106 and the adhesive characteristics of the adhesives that are applied to the resilient layer 106, should be selected so that the display 122 will not become dislodged from the motherboard 102 when the handheld computing device 100 is exposed to impact forces typical of those encountered during use of the handheld computing device 100.

To reduce the likelihood of impact damage to the display panel 103, preferably the adhesives are applied symmetrically to the resilient layer 106 and the resilient layer 106 itself has a symmetrical shape, so as to cause the impact forces to be applied uniformly to the display panel 103. Further, since there are no compression forces from the front cover plate to balance the rear support forces from the rear cover plate at the centre of the display panel 103, preferably the resilient layer 106 has a hole cut in its centre to thereby support the display panel 103 at its outer edges.

The invention claimed is:

1. A display for a handheld computing device, comprising:
   a display panel;
   a display circuit board carrying display electronics for the display panel;
   a motherboard; and
   a resilient layer having a first surface and a second surface, the first surface being adhered to the display circuit board, and the second surface adhered to the motherboard, the second surface comprising a repositional adhesive, and the resilient layer being positioned such that the resilient layer is disposed between the display circuit board and the motherboard.

2. The display as claimed in claim 1, wherein the resilient layer further has an internal opening to receive a component located on a bottom side of the display circuit board.

3. The display as claimed in claim 1, wherein the resilient layer comprises:
   an upper horizontal end;
   a lower horizontal end; and
   a pair of vertical sides extending between the upper and lower horizontal ends.

4. The display as claimed in claim 1, wherein:
   the first surface is a permanent adhesive surface.

5. The display as claimed in claim 3, wherein:
   the second surface is disposed only along the upper and horizontal ends of the resilient layer.

6. The display as claimed in claim 3, wherein:
   the second surface is disposed only along the pair of vertical sides of the resilient layer.

7. The display as claimed in claim 3, wherein:
   the second surface is disposed only in corners of the resilient layer.

8. The display as claimed in claim 1, further comprising:
   a light guide coupled to the display panel and the display circuit board, the light guide including first and second clips for securing the display to a second circuit board of the computing device, the first and second clips being configured to allow the display to move relative to the computing device when the display panel is mounted to the handheld computing device.

9. The display as claimed in claim 8, further comprising:
   a light reflective plate located between the display circuit board and the light guide.

10. The display as claimed in claim 9, further comprising a pair of opposed cover plates fastened to the light guide and being configured to provide electrostatic discharge (ESD) protection for the display panel and the display circuit board.

11. The display as claimed in claim 10, wherein the display panel, the display circuit board and the light guide are disposed between the cover plates.

12. The display as claimed in claim 10, wherein the opposed cover plates include locking tabs that fasten the cover plates to the light guide.

13. The display as claimed in claim 9, wherein the light guide includes at least one guide pin for aligning the display panel with the display circuit board of the computing device.

14. A handheld computing device comprising:
   a motherboard;
   a display mounted to the motherboard, the display comprising:
      a display panel; and
      a display circuit board carrying display electronics for the display panel; and
      a resilient layer having a first surface and a second surface, the first surface being adhered to the display circuit board, the second surface adhered to the motherboard and comprising a repositional adhesive, and the resilient layer being positioned such that the resilient layer is disposed between the circuit display board and the motherboard.

15. The handheld computing device as claimed in claim 14, wherein the resilient layer further has an internal opening to receive a component located on a bottom side of the display circuit board.

16. The handheld computing device as claimed in claim 14, wherein:
   the first surface is a permanent adhesive surface.

17. The handheld computing device as claimed in claim 14, wherein:

the display further comprises
  a light reflective plate located between the motherboard and the light guide; and
the handheld computing device further comprises
  a light guide coupled to the display panel and the display circuit board;
  the light guide including first and second clips for securing the display to a second circuit board of the handheld computing device, the first and second clips located at first and second sides of the light guide and being configured to allow the display to move relative to the motherboard.

18. The handheld computing device as claimed in claim 17, further comprising a pair of opposed cover plates fastened to the light guide and being configured to provide electrostatic discharge (ESD) protection for the display panel and the display circuit board.

19. The handheld computing device as claimed in claim 18, wherein the display panel, the display circuit board and the light guide are disposed between cover plates fastened to the light guide.

\* \* \* \* \*